United States Patent
Biegert

(10) Patent No.: US 8,731,779 B2
(45) Date of Patent: May 20, 2014

(54) METHOD AND DEVICE FOR ALIGNING A DETERMINED STEER ANGLE WITH A MEASURED STEER ANGLE

(75) Inventor: Rainer Biegert, Boehmenkirch (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 344 days.

(21) Appl. No.: 13/135,269

(22) Filed: Jun. 30, 2011

(65) Prior Publication Data

US 2012/0197494 A1    Aug. 2, 2012

(30) Foreign Application Priority Data

Feb. 1, 2011   (DE) .......................... 10 2011 000 434

(51) Int. Cl.
*B62D 15/00*   (2006.01)
*B62D 5/04*    (2006.01)
*B62D 15/02*   (2006.01)

(52) U.S. Cl.
CPC .................................. *B62D 15/0235* (2013.01)
USPC ........................................................... 701/42

(58) Field of Classification Search
USPC ........................................................... 701/42
See application file for complete search history.

(56) References Cited

U.S. PATENT DOCUMENTS

| | | | |
|---|---|---|---|
| 5,392,214 A * | 2/1995 | Momose et al. ................ | 701/44 |
| 6,239,568 B1 * | 5/2001 | Sugitani et al. ............... | 318/466 |
| 7,308,346 B2 | 12/2007 | Sugitani | |
| 2006/0047389 A1 * | 3/2006 | Sugitani ........................... | 701/41 |
| 2009/0114470 A1 * | 5/2009 | Shimizu et al. ............... | 180/444 |

FOREIGN PATENT DOCUMENTS

| | | | | |
|---|---|---|---|---|
| DE | 199 19 860 | | 1/2001 | |
| DE | 103 37 956 | | 4/2005 | |
| DE | 10337956 A1 | * | 4/2005 | .............. B62D 5/04 |
| DE | 10 2005 034 176 | | 3/2006 | |
| DE | 10 2008 021 849 | | 11/2009 | |
| DE | 102008021849 | * | 11/2009 | .............. B62B 15/02 |
| JP | 2005335631 A | * | 12/2005 | .............. B62D 7/14 |

* cited by examiner

*Primary Examiner* — Shelley Chen
(74) *Attorney, Agent, or Firm* — Jordan and Hamburg LLP

(57) ABSTRACT

A method for aligning a steer angle, which is determined continuously in a processor for controlling a steering system, with a second steer angle which is measured continuously by a sensor of the steering system, the steer angles varying over time in such a way as to deviate negatively and positively from a neutral value. A first time profile of the varying first steer angle is monitored continuously, and a second time profile of the varying second steer angle is monitored continuously. If no alignment of the first steer angle with the second steer angle has yet been carried out, the first steer angle is set to the present value of the second steer angle. If at least one alignment of the first steer angle with the second steer angle has already been carried out previously, and if a change of sign occurs in the first profile, the first steer angle is varied by a corrective value which is determined as a function of a hysteresis occurring in the second profile. The disclosure is particularly suitable for use in a control unit of an electric power steering system.

13 Claims, 5 Drawing Sheets

METHOD AND DEVICE FOR ALIGNING A DETERMINED STEER ANGLE WITH A MEASURED STEER ANGLE

BACKGROUND OF THE INVENTION

The invention relates to a method and a device for aligning a first steer angle, which is determined continuously in a processor for controlling a steering system, with a second steer angle which is measured continuously by a sensor of the steer system. The invention also relates to a steering system equipped with such a device.

Steering systems have been sufficiently described, in particular power steering systems which, by means of an electric motor, generate an auxiliary force or an auxiliary torque to assist the manual steering force or manual steering torque applied by the driver. So-called steer-by-wire systems have also been described in which there is no continuous mechanical connection between the steering handle (steering wheel) and steering system, but rather an electric motor generates the entire steering torque. In such steering systems, use is often made of a brushless direct-current motor which is operated by means of a sensor arrangement and a control unit connected thereto, in order to generate the required steering torque or auxiliary torque at all times. The transmission to the steering linkage takes place for example via toothed racks or belt drives. As in all steering systems, it is important for the deflection of the steered wheels to take place in a manner dependent as precisely as possible on the desired steer angle. The steer angle is predefined at the steering handle (steering wheel) and can be measured there for example by means of steer angle sensors. The steer angle, measured by separate sensors (and therefore also referred to as external steer angle), is then transmitted for example via signal lines or a data bus (CAN or Flexray) to the controller. The measured steer angle normally deviates from the physical steer angle.

Aside from the measured steer angle, it is also possible, by means of a continuous evaluation (in particular integration) of the rotor position at the electric motor, for a steering angle to be determined (therefore also referred to as internal steer angle). The rotor position is measured for example by means of magneto resistive sensors. The steer angle information gained in this way is required for some functions of the electrical steering system, such as for example for an active return or for artificially generated end stops. Since the system-internal sensors are relatively measuring angle sensors, an alignment of the internal steer angle with the measured steer angle is carried out, which measured steer angle is for example measured by an angle sensor installed in the steering column and is transmitted via CAN or Flexray. This is because the steer angle determined or calculated internally within the system cannot be unequivocally assigned a steering direction. Furthermore, the magnitude thereof may deviate significantly from the physical steer angle. Therefore, an alignment or a synchronization of the two steer angles has proven to be expedient. In the measured steer angles, however, there are often non-linear disturbances in the form of hystereses. During an alignment of the steer angles, therefore, the influence of hystereses should be compensated as fully as possible.

The present invention should permit compensation of angle errors, which arise on account of hysteresis, during the synchronization of a steering-system-internal steer angle with an external steer angle sensor.

SUMMARY OF THE INVENTION

It is therefore an object of the present invention to solve the above-stated problems by means of a method for aligning a determined steer angle with a measured steer angle. In particular, the invention should permit effective compensation of angle errors, which arise on account of hysteresis, during the synchronization of a steering-system-internal steer angle with an external steer angle sensor. It is also sought to propose a device which carries out the method, and a steering system equipped with the device.

Accordingly, a method is proposed which is suitable for aligning a first steer angle, which is determined continuously in a processor for controlling a steering system, with a second steer angle which is measured continuously by a sensor of the steering system, the steer angles varying over time in such a way as to deviate negatively and positively from a neutral value, and the method having the following steps:

a first time profile of the varying first steer angle is monitored continuously;

a second time profile of the varying second steer angle is monitored continuously;

if no alignment of the first steer angle with the second steer angle has yet been carried out, the first steer angle is set to the present value of the second steer angle;

if at least one alignment of the first steer angle with the second steer angle has already been carried out previously, and if a change of sign occurs in the first profile, the first steer angle is varied by a corrective value which is determined as a function of a hysteresis occurring in the second profile.

Furthermore, a device is proposed which has a processor for controlling a steering system, which processor continuously determines the first steer angle, and is connected to a sensor which continuously measures the second steer angle. The device continuously monitors a first time profile of the varying first steer angle and a second time profile of the varying second steer angle. If no alignment of the first steer angle with the second steer angle has yet been carried out, the device sets the first steer angle to the present value of the second steer angle, and if at least one alignment of the first steer angle with the second steer angle has already been carried out previously and if a change of sign occurs in the first profile, the device varies the first steer angle by a corrective value, which is determined as a function of a hysteresis occurring in the second profile. The device may for example be designed as a control unit for controlling the steering system.

Also proposed is a steering system which is equipped with a device of said type.

The invention is based on the following realization: if the external steer angle sensor, that is to say the measured steer angle, has too great a hysteresis, the internally determined steer angle can no longer be unequivocally aligned therewith because the zero position is transmitted at different positions, depending on the direction in which the steering movement passes through the zero crossing. This has the result that an offset error arises during the alignment, and a re-synchronization of the internal steer angle with the external steer angle can subsequently be triggered if the difference between the two angles exceeds a limit value. During the re-synchronization, a step of a few degrees occurs in the internal angle signal. In unfavourable situations, it may even be the case that re-synchronization takes place upon every zero crossing after a steering reversal.

If, according to the invention, however, the hysteresis is taken into consideration during the synchronization of the internal steer angle with the external steer angle, a subsequent re-synchronization during operation will take place much less frequently. The internal steer angle thus has a more continuous profile and further internal angle corrective values can be determined more effectively and more continuously (for example during the course of a long-term steer angle correction).

Accordingly, it is preferably detected that a hysteresis relevant for the determination of the corrective value occurs in the second profile if a torque is measured which lies within a predefinable torque range, and/or if a steer speed is determined which lies within a predefinable speed range.

The first steer angle is preferably varied by the corrective value only if the second steer angle lies within a predefinable angle range, in the middle of which lies the neutral value.

The corrective value is preferably determined as a function of a difference, caused by the hysteresis, arising between the first steer angle and the second steer angle, the difference being determined both for the positive steer direction and also for the negative steer direction. Here, the corrective value is determined as an average value of said differences in the positive and negative steer directions. This is because tests have shown that, in most usage cases, the hysteresis is symmetrical, that is to say has approximately the same value in both steer directions.

The determination of the difference in the positive and/or negative steer direction is carried out only when the second steer angle has varied by for example 8 degrees within the predefinable angle range of for example −10 degrees to +10 degrees. This is because it can then be assumed that the hysteresis in the respective steer direction has been fully overcome.

The invention and the resulting advantages will be explained in detail on the basis of the following description, with reference being made to the appended drawings:

DESCRIPTION OF THE PREFERRED EMBODIMENTS

Figure 1:
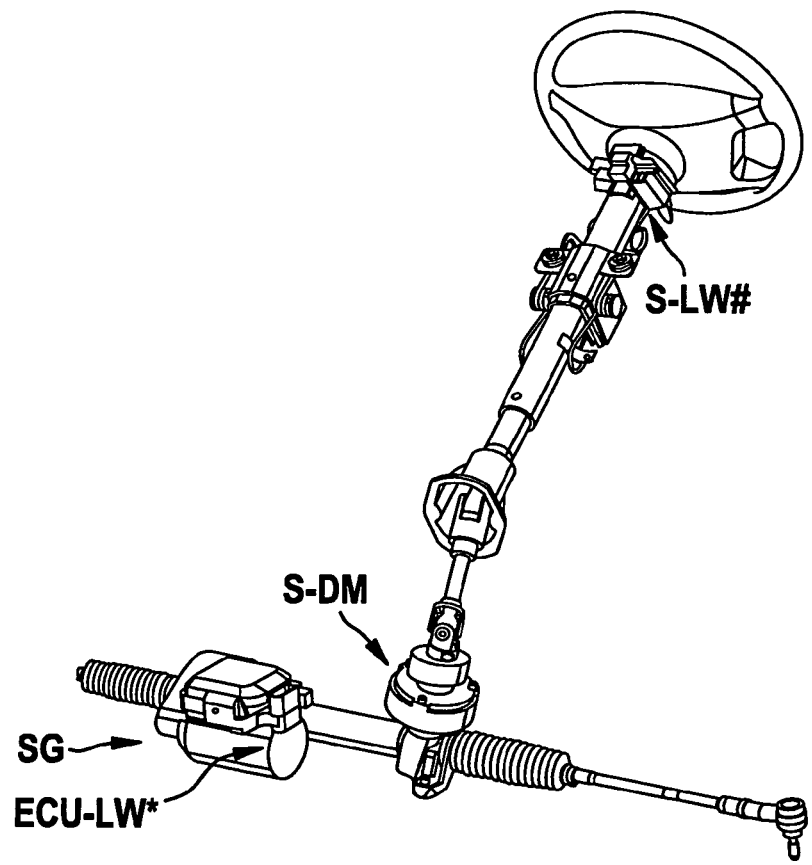
FIG. 1 schematically shows the design of a steering system having a device which is designed as a control unit and which operates according to the method proposed here.
Figure 2:
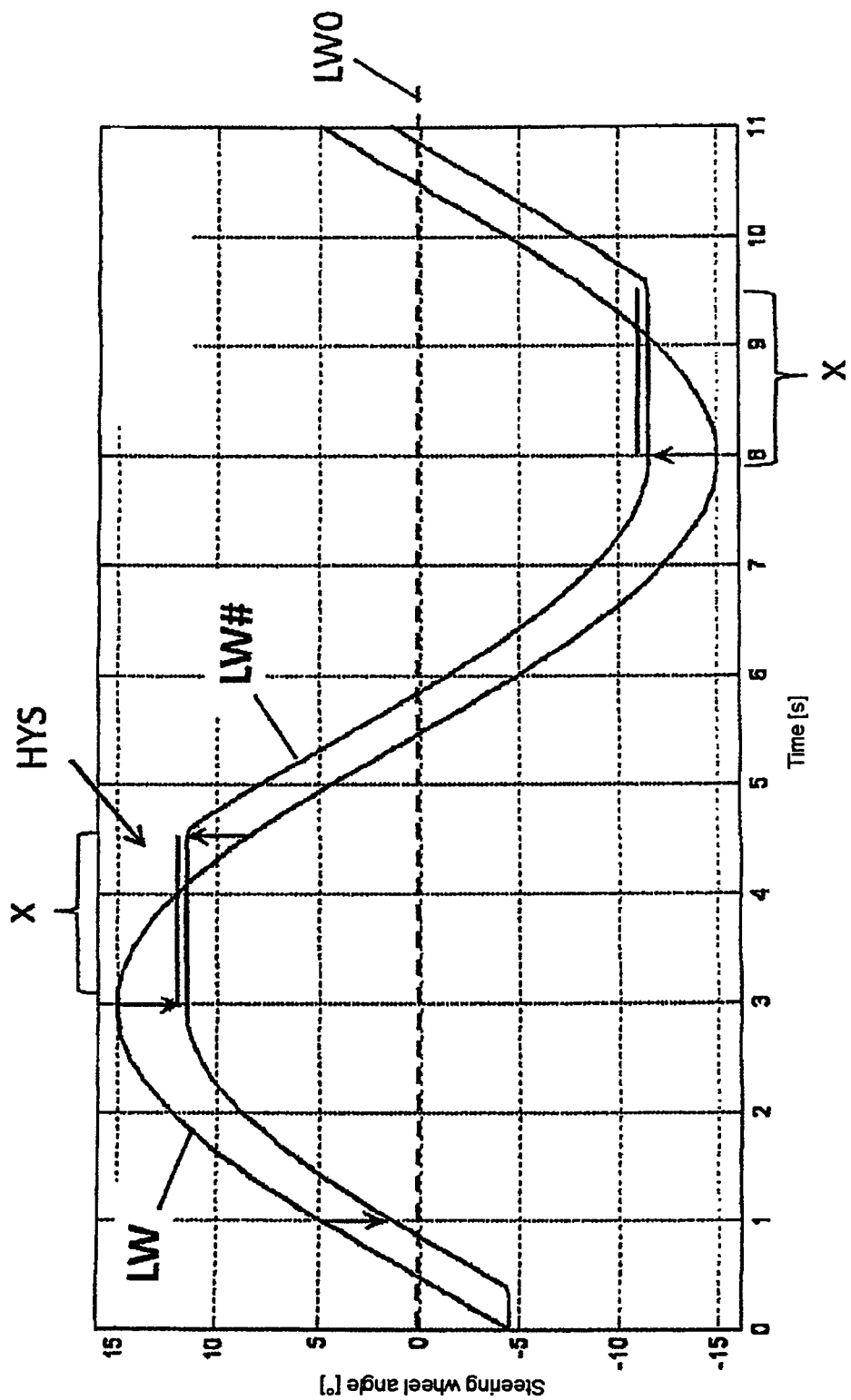
FIG. 2 shows the time profile of a physical steer angle (ideal profile) and of a measured steer angle which has been distorted by hystereses.
Figure 3:
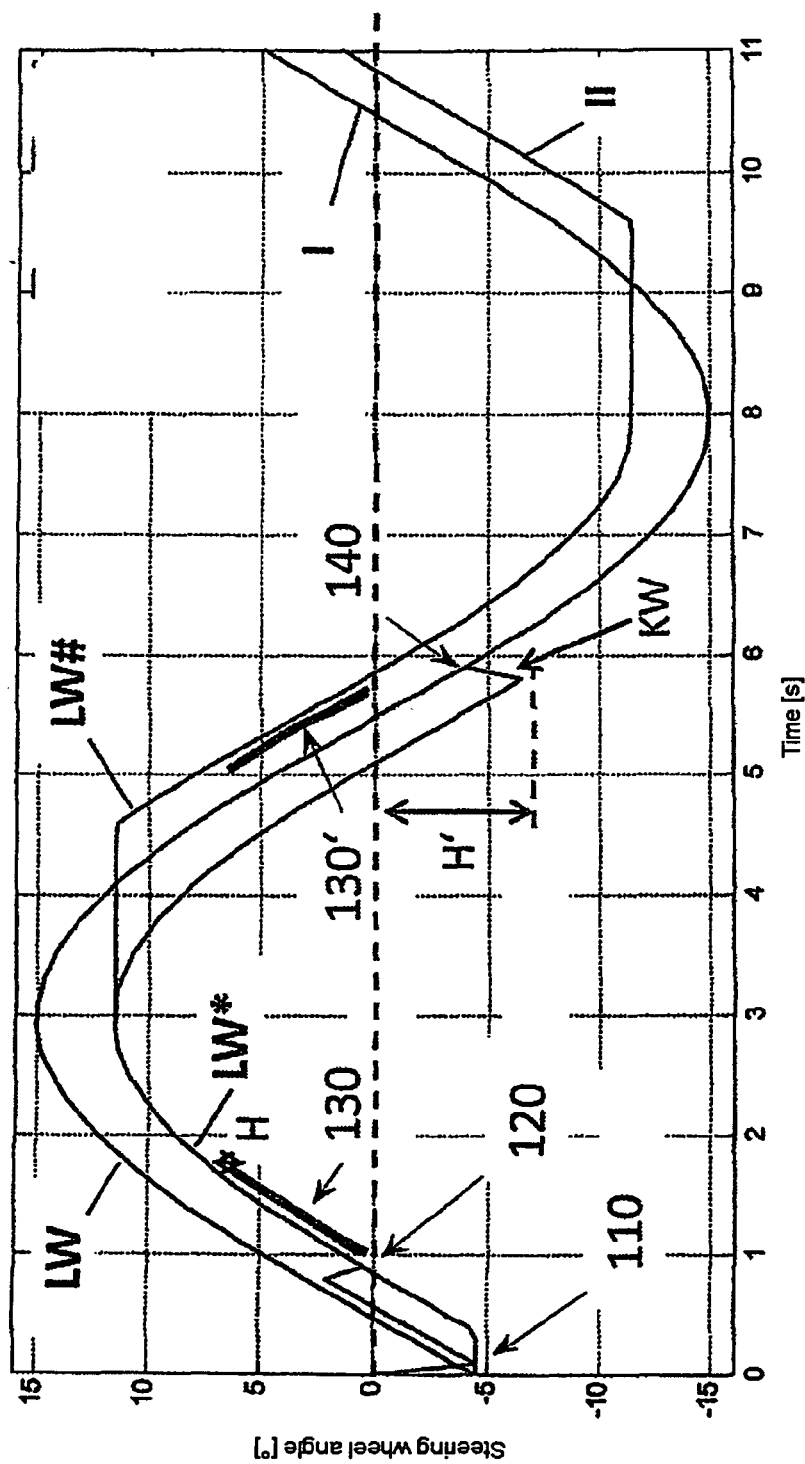
FIG. 3 building on FIG. 2, also shows the time profile of a determined steer angle which is aligned with the measured steer angle.

FIG. 1 shows a steering system LS which, in the region of the steering column, has a sensor arrangement or sensors S-LW# which measure the steer angle there (see LW# in FIGS. 2 and 3). The steering system LS also has a torque sensor S-DM which measures the present steering torque (see DM in FIG. 4*a*). Furthermore, the steering system LS has a control unit SG which is arranged on the electric motor and actuates the latter. The control unit comprises a processor unit ECU-LW* which determines inter alia a steer angle (see LW* in FIGS. 2 and 3) from the rotor position of the electric motor. The control unit SG also constitutes a device according to the invention which, according to the method proposed here (see also FIG. 5), carries out an alignment of the determined steer angle with the measured steer angle. The control unit SG therefore processes the following signals or data: the steer angle LW# measured by the sensor S-LW#, the data being transmitted via a CAN bus, and the torque DM measured by the sensor S-DM and the steer angle LW* determine dinternally in the control unit.

A cause for the steer angle signal hysteresis seen in the steering control unit SG is the actual hysteresis of the steer angle sensor S-LW#, to which errors are however also added on account of the delay time during the signal transmission (for example via the CAN bus). Furthermore, there are also errors between the steer angle signal LW# measured at the steering column and the control-unit-internal steer angle LW* on account of the twisting of the steering column (torsion bar) and the universal joints.

FIG. 2 shows the problem of occurring hystereses. The time profile of the physical steer angle LW (actual steering wheel position) has no disturbances and is illustrated in idealized form as a sinusoidal profile in which the steer angle varies uniformly between +15 degrees and −15 degrees. Said profile is obtained by means of a sinusoidally uniformly varying steer input or by means of a corresponding simulation in the control unit SG. The time profile of the steer angle LW# measured at the external steer angle sensor S-LW# is illustrated as a hysteresis-afflicted signal. The vertical arrows show the so-called trailing pointers of the hysteresis, that is to say the magnitude by which the measured value lags. In the regions of steering reversal, marked by an X, it is not possible to unequivocally assign the measured value to the actual position because the hysteresis has not been fully "overcome". Here, the "overcoming" of the hysteresis should be understood to mean the state in which the function LW# duly lags the function LW (see, in FIG. 2, for example the time interval from 0 to 3 seconds), but in which a steady state or saturation state has not yet taken effect. When the hysteresis has been fully overcome, the function LW# initially remains constant at the last value, and only later follows the change or reversal tendency of the function LW (see, in FIG. 2, for example the time interval from 3 to 4.5 seconds).

The alignment or synchronization of the internally determined steer angle LW* with the externally measured steer angle LW# taking into consideration the hysteresis will be described on the basis of FIGS. 3 to 5.

In addition to the time profiles of the physical steer angle LW and of the measured steer angle LW#, FIG. 3 also shows the profile of the steer angle LW* determined by the control unit, which should correspond as precisely as possible to the profile of the physical steer angle. However, since the physical steer angle itself cannot be present as a measured value, but only the measured and determined steer angles are present, the steer angle LW* is aligned here with the steer angle LW# in order, as a result, to obtain a profile which should as precisely as possible reflect the real profile (physical steer angle LW).

Figure 4:
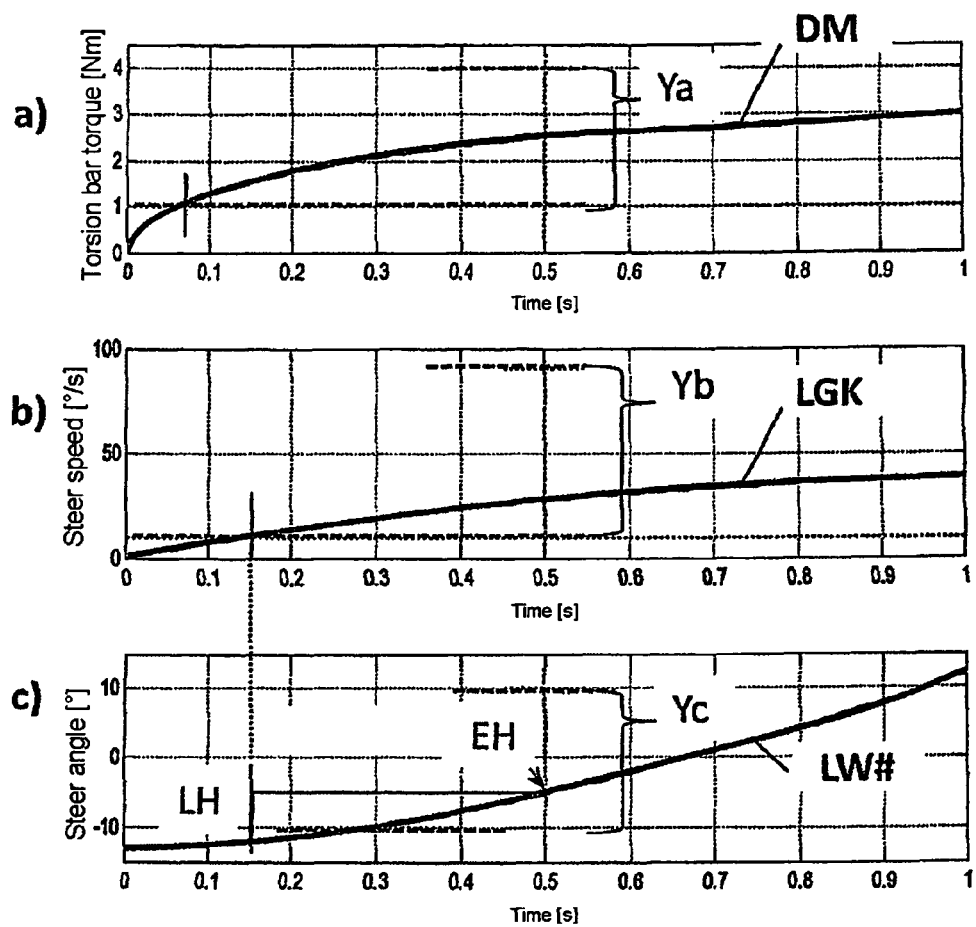
FIGS. 4*a-c* show the determination of a hysteresis occurring in the profile of the measured steer angle.
Figure 5:
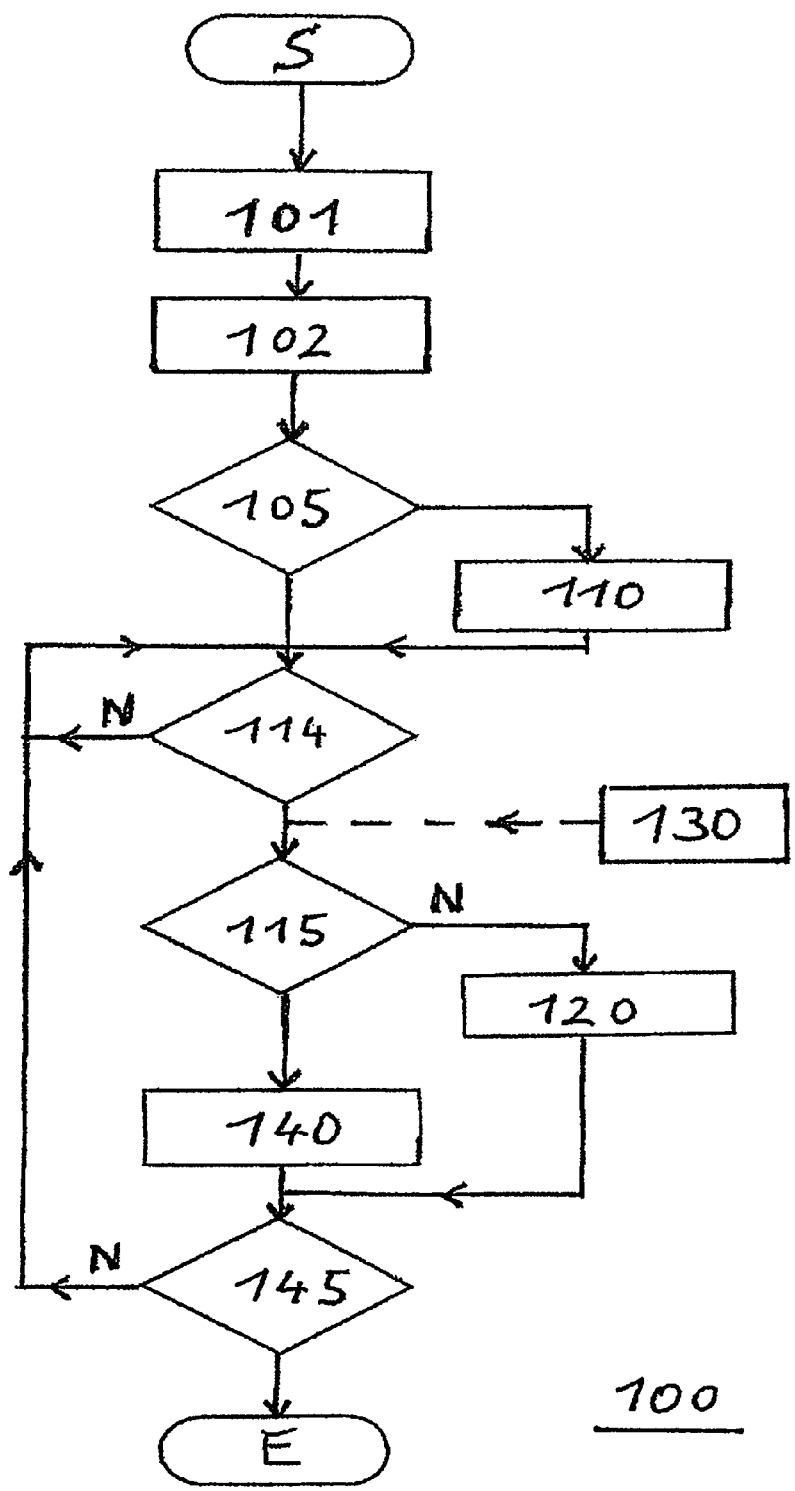
FIG. 5 shows a flow diagram for the method proposed here for aligning the determined steer angle with the measured steer angle.

In addition to FIG. 3, FIGS. 4*a-c* and 5 serve to explain the invention further. FIGS. 4*a-c* show the determination of a hysteresis arising in the profile of the measured steer angle, and the calculation of a corrective value. FIG. 5 shows a flow diagram for the method proposed here.

For a detailed description of the invention, reference is therefore made hereinafter to FIGS. 3 to 5:

The method 100 (see FIG. 5) for aligning the first steer angle LW* with the second steer angle LW# (see FIG. 3) comprises the continuous monitoring of the two steer angles. For this purpose, in a step 101, the time profile I of the first steer angle LW* is monitored, and in a step 102, the time profile II of the second steer angle LW* is monitored.

In step 105, it synchronization should yet been carried out, is checked whether rough take place. If no alignment has which is the case for example upon start-up or resetting of the control unit SG (see FIG. 2), in a step 110 the first steer angle LW* is set to the present value of the second steer angle LW#.

In the example shown in FIG. 3, this takes place at the time t=0. Here, for example, the steer angle LW* is set to the value −4.8.

In other words: directly after the start-up of the steering system, the internal steer angle LW* is aligned with the first valid value of the external steer angle LW# (see also point 110 in FIG. 3). The internal steer angle LW* is therefore immediately available. However, said state is initially referred to as "roughly initialized", because it is not yet ensured that the zero point of the internal steer angle also corresponds to the zero point of the external sensor. Possible errors which may still be present in this state are for example a non-linear toothed rack transmission ratio; card an errors of the universal joints, hystereses and torsion in the steering column and in the steering system (thrust piece play, worm gear) and/or signal delay/data age if the steering column is rotating.

The further alignments always take place at a certain time, in this case preferably at the zero crossing of LW#. Firstly, a zero crossing is associated with a change of sign of the steering direction, which is easily detectable. Secondly, the alignment takes place only in the vicinity of the neutral position (neutral value LWO), that is to say in the region of straight-ahead driving, which should be monitored and controlled particularly precisely.

If, therefore, at least one alignment has already been carried out and if a change of sign occurs in the first profile I (query 114), in a step 120 or 140, the first steer angle LW* is varied by a corrective value (see also points 120 and 140 in FIG. 3). Here, the corrective value should as far as possible be dependent on the hysteresis (see HYS in FIG. 3), in order thereby to attain compensation of the latter.

However, when the hysteresis has not yet been quantified, which is the case in particular directly after the start of the method (see time t=1 second in FIG. 3), no corrective value can yet be present either (query 115). In this case, the internal steer angle LW* is aligned anew with the external steer angle LW#, in order that the zero positions of the two steer angles better correspond (see point 120 in FIG. 3). After this more precise alignment of the internal steer angle has taken place, it is "precisely initialized" (step 120). In the previous process, therefore, no hysteresis has yet been taken into consideration.

When a hysteresis can be quantified, and therefore a corrective value can be corrected (block 130), the internal steer angle LW* is aligned, taking into consideration the hysteresis, with the external steer angle LW# (see point 140 in FIG. 3). To be able to compensate for the hysteresis during the alignment or synchronization, said hysteresis must thus initially be determined. This takes place separately in the positive and negative steering directions (see regions 130 and 130' in FIG. 3). The hysteresis is overcome in one direction when the steering torque and the steer speed are aligned in said direction and are above minimum values and steering has moved further in said direction than the expected hysteresis. This is shown by way of example on the basis of FIGS. 4 a) to 4 c):

FIG. 4 a) shows the time profile of the torsion bar torque DM (see also sensor S-DM in FIG. 1), which meets the overcoming condition at approximately 0.07 seconds in that DM lies above the minimum value of 1 Nm. The tolerance range Ya in which the torque DM may lie extends for example from 1 Nm to 4 Nm.

FIG. 4 b) shows the time profile of the steer speed LGK, which meets the conditions, specifically exceeds a minimum value of for example 10 degrees/second, at approximately 0.15 seconds. Said time defines the start value of the internal steer angle for the overcoming of the hysteresis. If the steer angle LW* moves onward from here by a certain minimum value in the positive direction and, here, the torsion bar torque and the steer speed remain above the minimum value, then the hysteresis can thereafter be calculated for said direction if the steer angle LW* is in the mid-range Yc and the torsion bar torque DM lies within the tolerance band Ya and the steer speed lies within the tolerance band Yb.

For the positive movement direction or steering direction, the following applies:

$$\text{Hysteres\_pos} = \text{ext}Lw - \text{int}Lw$$

(that is to say the difference H between LW# and LW* at point 130 in FIG. 3).

Similarly, for the negative movement direction, the following applies:

$$\text{Hysteres\_neg} = \text{ext}Lw - \text{int}Lw$$

(that is to say the difference H' between LW# and LW* at point 130' in FIG. 3).

The respective hysteresis is determined only in the vicinity of the centre, since it should be used for compensation in said angle range too, such that position-dependent errors such as may arise for example as a result of the universal joint do not have an effect.

For compensation, use is made not of the respective hysteresis as a whole, but rather of a mean value formed from both hystereses, calculated as follows:

$$\text{Hysteres ges} = (\text{Hysterese\_neg} - \text{Hysterese\_pos})/2$$

Said mean value represents the corrective value KW (see also FIG. 3) and, in this example, is calculated as follows:

Firstly, the positive hysteresis is calculated: (see end of the region 130 in FIG. 3)

$$\begin{aligned}\text{Hysterese\_pos} &= extLw - intLw \\ &= 5 \text{ degrees} - 5 \text{ degrees} \\ &= 0 \text{ degrees}\end{aligned}$$

In the illustrated example, the hysteresis or difference H=0 degrees, because the values LW* and LW# are approximately equal in the region 130.

The negative hysteresis is then calculated: (see point 130')

$$\begin{aligned}\text{Hysterese\_neg} &= extLw - intLw \\ &= 0 \text{ degrees} - (-7 \text{ degrees}) \\ &= 7 \text{ degrees}\end{aligned}$$

In the illustrated example, the difference H'=+7 degrees, because at the end of the range 130', the value LW* deviates to a corresponding extent from LW#.

Finally, by average value formation, the corrective value KW is calculated:

$$\begin{aligned}KW &= \text{Hysterese\_ges} \\ &= (\text{Hysterese\_neg} - \text{Hysterese\_pos})/2 \\ &= (7 \text{ degrees} - (0 \text{ degrees}))/2 \\ &= 7 \text{ degrees}/2 \\ &= 3.5 \text{ degrees}\end{aligned}$$

In said example, the corrective value KW is thus 3.5 degrees.

If the corrective value KW (averaged total hysteresis) is known, then it is taken into consideration during the next re-synchronization of the internal steer angle LW* with the external steer angle LW# (see method step 140 in FIG. 5 and point 140 in FIG. 3). An alignment or a synchronization is however carried out only when the hysteresis has also been overcome. This may be queried in step 115. This is because the relationship between the physical steering wheel position LW and the hysteresis-afflicted measure value LW# of the steer angle sensor is known only in said situation. If a synchronization has been carried out, that is to say the value of the internal steer angle LW* has been newly set, the previously determined partial values of the hysteresis in the positive or negative direction must be discarded and newly determined. An already-determined corrective value KW (total hysteresis) may in contrast be maintained. Here, the re-synchronization is for example always carried out at a zero crossing; said re-synchronization may however also be carried out in a certain range around the central position (neutral value).

To reduce the abovementioned errors in the synchronization on account of the signal delay and possible steering twisting, said synchronization is carried out only in situations with low steering dynamics. Low steering dynamics means that the steer speed is low enough that the hand-imparted torque is low and the motor-imparted torque is low. This may be queried in step 115.

A steer speed LGK of 100 degrees/second would, in the case of a CAN bus transmission with a 10 ms raster, result for example in an angle error of up to 100 degrees/second*0.01 seconds 1 degree. Likewise, twisting of the steering column with 3 Nm hand-imparted torque in the case of a torsion bar stiffness of 2.1 Nm/degree would result in twisting of 3 Nm/2.1 Nm/degree=1.4 degrees. Without restriction or correction of the stated variables, therefore, additional relevant errors would arise.

To be able to take the hysteresis HYS into consideration already during the first re-synchronization after the start-up of the system (for example in step 120), said hysteresis is permanently stored in a non-volatile memory and is overwritten with in each case newly determined values. Said value may then be read out from the memory upon every start-up of the system and taken into consideration during the first re-synchronization. The prerequisite for this is that the hysteresis has already been overcome here; otherwise, the first re-synchronization (step 120) must take place without taking the hysteresis into consideration.

The invention is particularly suitable for use in a control unit of an electric power steering system.

LIST OF REFERENCE SYMBOLS

LS Steering system
S-LW# Sensor on the steering column (measures steer angle LW#)
S-DM Sensor on the steering gear (measures torque DM)
SG Control unit
ECU-LW* Processor (calculates steer angle LW*)
LW# Measured steer angle
LW* Determined or calculated steer angle
LW Physical steer angle
LWO Neutral value (zero angle during straight-ahead driving)
I, II Time profile of LW* and LW# respectively
HYS Hysteresis
X Region of the overcome hysteresis
H Difference between LW* and LW# for positive steer direction
H' Difference between LW* and LW# for negative steer direction
KW Corrective value
DM Torque within the tolerance range Ya
LGK Steer speed within the tolerance range Yb
Yc Tolerance range for the steer angle LW*
LH Minimum value for the steer angle change
100 Method with steps 101-145

The invention claimed is:

1. A method for aligning a first steer angle, which is determined continuously in a processor for controlling a steering system, with a second steer angle which is measured continuously by a sensor of the steering system, the steer angles varying over time in such a way as to deviate negatively and positively from a neutral value, the method comprising the following steps:
   a first time profile of the varying first steer angle is monitored continuously;
   a second time profile of the varying second steer angle is monitored continuously;
   if no alignment of the first steer angle with the second steer angle has yet been carried out, the first steer angle is set to the present value of the second steer angle;
   if at least one alignment of the first steer angle with the second steer angle has already been carried out previously, and if a change of sign occurs in the first profile, the first steer angle is varied by a corrective value which is determined as a function of a hysteresis occurring in the second profile.

2. A method according to claim 1, it being detected that a hysteresis relevant for the determination of the corrective value occurs in the second profile if a torque is measured which lies within a predefinable torque range.

3. A method according to claim 1, it being detected that a hysteresis relevant for the determination of the corrective value occurs in the second profile if a steer speed is determined which lies within a predefinable speed range.

4. A method according to claim 1, the first steer angle being varied by the corrective value only if the second steer angle lies within a predefinable angle range, in the middle of which lies the neutral value.

5. A method according to claim 1, the corrective value being determined as a function of a difference, caused by the hysteresis in the positive and/or negative steer direction, arising between the first steer angle and the second steer angle.

6. A method according to claim 5, the corrective value being calculated as a mean value of the difference arising in the positive steer direction and the difference arising in the negative steer direction.

7. A method according to claim 5, the corrective value being calculated if the second steer angle has been varied by a predefinable minimum value within a predefinable angle range.

8. A device for aligning a first steer angle with a second steer angle comprising a processor for controlling a steering system, which processor continuously determines the first steer angle, and being connected to a sensor which continuously measures the second steer angle, the steer angles varying over time in such a way as to deviate negatively and positively from a neutral value, the device:
   continuously monitoring a first time profile of the varying first steer angle;
   continuously monitoring a second time profile of the varying second steer angle,
   and the device:
   setting the first steer angle to the present value of the second steer angle if no alignment of the first steer angle with the second steer angle has yet been carried out; or
   varying the first steer angle by a corrective value, which is determined as a function of a hysteresis occurring in the second profile, if at least one alignment of the first steer angle with the second steer angle has already been carried out previously and if a change of sign occurs in the first profile.

9. A device for carrying out the method according to claim 1.

10. A device according to claim 8 being designed as a control unit for controlling the steering system.

11. A steering system having a device according to claim 8.

12. A method for aligning a first steer angle with a second steer angle, comprising providing a processor for controlling a steering system, which processor continuously determines the first steer angle, and being connected to a sensor which continuously measures the second steer angle, the steer angles varying over time in such a way as to deviate negatively and positively from a neutral value;

continuously monitoring a first time profile of the varying first steer angle;

continuously monitoring a second time profile of the varying second steer angle;

setting the first steer angle to the present value of the second steer angle if no alignment of the first steer angle with the second steer angle has yet been carried out; or varying the first steer angle by a corrective value, which is determined as a function of a hysteresis occurring in the second profile, if at lest one alignment of the first steer angle with the second steer angle has already been carried out previously and if a change of sign occurs in the first profile.

13. A device for a steering system comprising a processor, a sensor, said processor being operable for aligning a first steer angle, which is determined continuously in the processor for controlling the steering system, with a second steer angle which is measured continuously by the sensor of the steering system, the steer angles varying over time in such a way as to deviate negatively and positively from a neutral value, said processor monitoring continuously a first time profile of the varying first steer angle;

said processor monitoring continuously a second time profile of the varying second steer angle;

if no alignment of the first steer angle with the second steer angle has yet been detected by the processor, the first steer angle is set by the processor to the present value of the second steer angle;

if at least one alignment of the first steer angle with the second steer angle has already been detected by the processor previously, and if a change of sign occurs in the first profile, the first steer angle is varied by the processor by a corrective value which is determined as a function of a hysteresis occurring in the second profile.

\* \* \* \* \*